US009031775B2

(12) United States Patent
Vargas

(10) Patent No.: US 9,031,775 B2
(45) Date of Patent: May 12, 2015

(54) DETERMINING LOCATIONS OF WIRELESS MOBILE DEVICES

(75) Inventor: Bogart Vargas, Arlington, VA (US)

(73) Assignee: Raytheon Company, Waltham, MA (US)

( * ) Notice: Subject to any disclaimer, the term of this patent is extended or adjusted under 35 U.S.C. 154(b) by 630 days.

(21) Appl. No.: 12/849,095

(22) Filed: Aug. 3, 2010

(65) Prior Publication Data

US 2012/0035845 A1 Feb. 9, 2012

(51) Int. Cl.
*G08G 1/16* (2006.01)
*G06G 7/78* (2006.01)
*G01S 3/02* (2006.01)
*G01S 5/02* (2010.01)
*G06Q 30/02* (2012.01)

(52) U.S. Cl.
CPC ............ *G01S 5/0289* (2013.01); *G01S 5/0221* (2013.01); *G06Q 30/0261* (2013.01)

(58) Field of Classification Search
CPC ......... G01S 19/17; G01S 5/0289; G01S 5/14; H04W 64/00; H04W 84/18; G06W 30/02; G06W 30/0259
USPC .......... 701/300, 301; 342/450, 451, 452, 453, 342/463
See application file for complete search history.

(56) References Cited

U.S. PATENT DOCUMENTS

| | | | |
|---|---|---|---|
| 7,129,891 B2 | 10/2006 | Meunier | |
| 7,595,754 B2 | 9/2009 | Mehta | |
| 7,952,522 B2* | 5/2011 | Hohl | 342/463 |
| 2006/0078122 A1 | 4/2006 | Dacosta | |
| 2008/0091352 A1* | 4/2008 | O'Hare | 701/301 |
| 2009/0160711 A1* | 6/2009 | Mehta | 342/450 |
| 2009/0310593 A1* | 12/2009 | Sheynblat et al. | 370/350 |
| 2010/0094482 A1* | 4/2010 | Schofield et al. | 701/2 |
| 2011/0043407 A1* | 2/2011 | Moshfeghi | 342/394 |
| 2011/0090124 A1* | 4/2011 | Liu et al. | 342/463 |
| 2011/0111726 A1* | 5/2011 | Kholaif et al. | 455/404.2 |
| 2011/0115624 A1* | 5/2011 | Tran | 340/540 |
| 2011/0173072 A1* | 7/2011 | Ross et al. | 705/14.57 |
| 2011/0184646 A1* | 7/2011 | Wong et al. | 701/300 |
| 2011/0210843 A1* | 9/2011 | Kummetz | 340/517 |
| 2011/0221635 A1* | 9/2011 | Wang | 342/463 |
| 2011/0267220 A1* | 11/2011 | Strachan et al. | 342/126 |
| 2011/0270519 A1* | 11/2011 | Park et al. | 701/201 |
| 2012/0130632 A1* | 5/2012 | Bandyopadhyay et al. | 701/446 |
| 2012/0142366 A1* | 6/2012 | De Castro Riesco et al. | 455/456.1 |
| 2012/0162012 A1* | 6/2012 | Marzouki et al. | 342/378 |
| 2012/0169533 A1* | 7/2012 | Harper et al. | 342/357.29 |
| 2013/0116966 A1* | 5/2013 | D'Jesus Bencci et al. | 702/150 |

OTHER PUBLICATIONS

R Nave, Global Positioning System, R Nave, Feb. 15, 2006, Georgia State University, http://hyperphysics.phy-astr.gsu.edu/hbase/gps.html.*

* cited by examiner

*Primary Examiner* — Khoi Tran
*Assistant Examiner* — Robert Nguyen
(74) *Attorney, Agent, or Firm* — Cantor Colburn LLP

(57) ABSTRACT

In certain embodiments, an apparatus comprises an input and one or more processors. The input receives known locations of wireless mobile nodes over a wireless link. The one or more processors determine geometric features associated with the locations, and calculate an apparatus location of the apparatus from the known locations and the geometric features.

20 Claims, 3 Drawing Sheets

DETERMINING LOCATIONS OF WIRELESS MOBILE DEVICES

TECHNICAL FIELD

This invention relates generally to the field of wireless communications and more specifically to determining locations of wireless mobile devices.

BACKGROUND

Positioning systems may be used to determine the location of nodes. For example, a global positioning system (GPS) uses satellites to track the location of nodes. GPS satellites, however, may be targeted for attack.

SUMMARY OF THE DISCLOSURE

In accordance with the present invention, disadvantages and problems associated with previous techniques for determining location may be reduced or eliminated.

In certain embodiments, an apparatus comprises an input and one or more processors. The input receives known locations of wireless mobile nodes over a wireless link. The one or more processors determine geometric features associated with the locations, and calculate an apparatus location of the apparatus from the known locations and the geometric features.

Certain embodiments of the invention may provide one or more technical advantages. A technical advantage of one embodiment may be that a wireless mobile node may receive locations of other wireless mobile nodes and may determine its location from the received locations using triangulation. Triangulation using 3 to 5, 5 to 10, or 10 or more mobile nodes may provide for a more precise location determination. Another technical advantage of one embodiment may be that the locations may be determined inside of a structure, such as a building. Another technical advantage of one embodiment may be that location may be determined in three-dimensions. For example, location may be determined in longitude, latitude, and elevation. Another technical advantage of one embodiment may be that wireless mobile node may be embodied as a telephone, a computer, a computer peripheral device, a missile device, a nano-device, or a vehicle.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
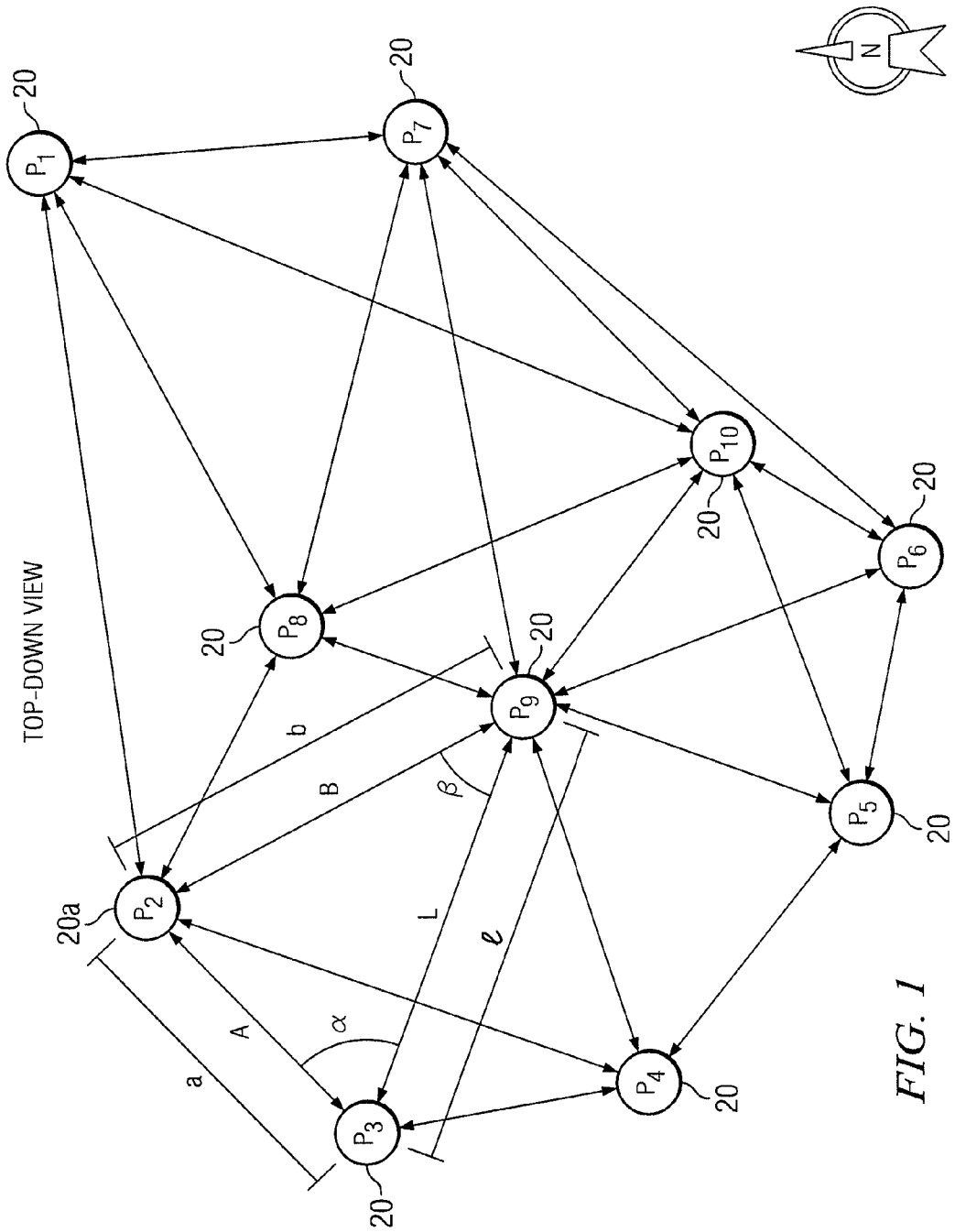
FIG. 1 illustrates an example of a top-down view of a number of wireless mobile nodes for which location may be determined.

FIG. 1 illustrates an example of a top-down view of a number of wireless mobile nodes 20 (including node 20a).

Figure 2:
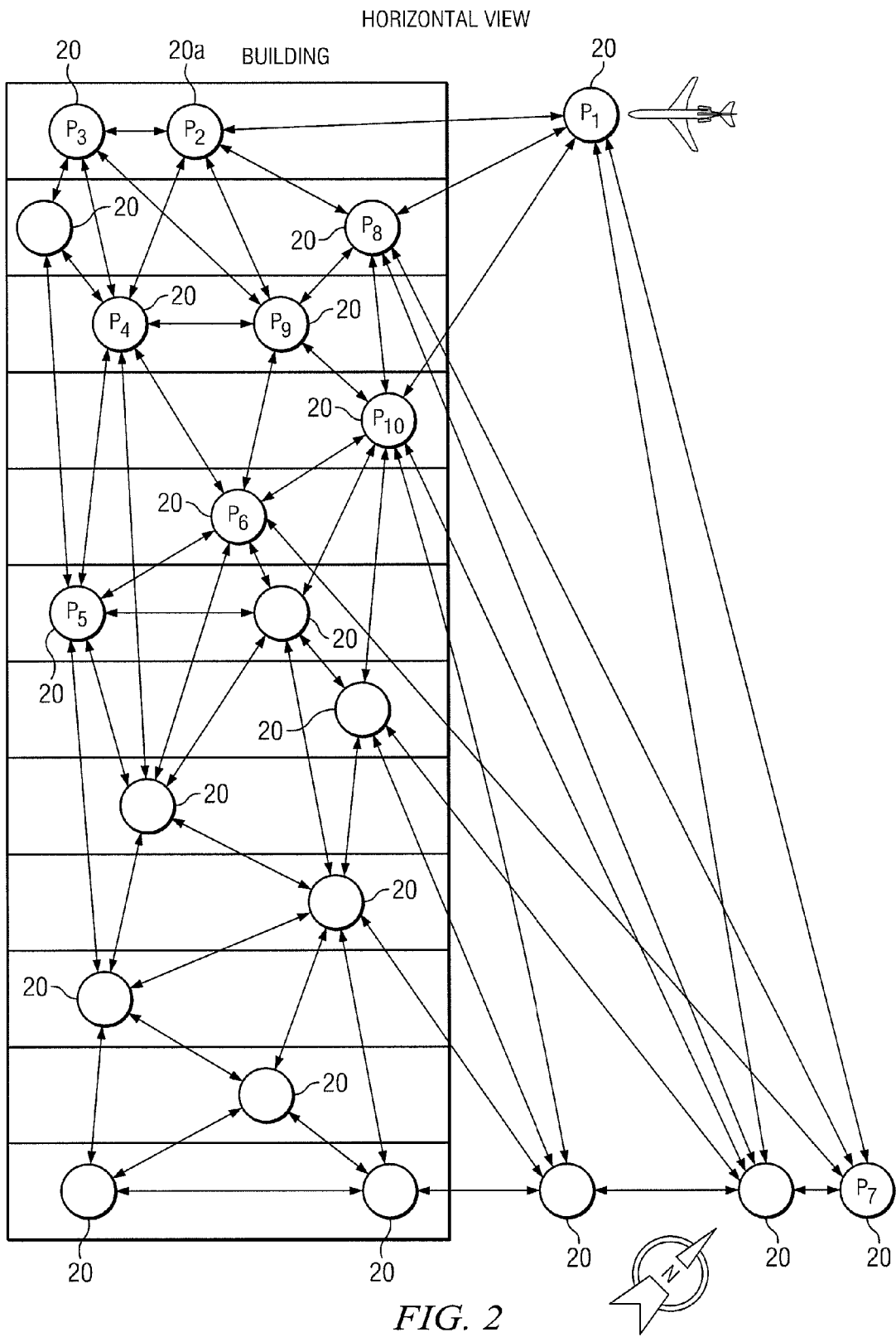
FIG. 2 illustrates an example of a horizontal view of a number of wireless mobile nodes for which location may be determined.

FIG. 2 illustrates an example of a horizontal view of a number of wireless mobile nodes 20 (including node 20a).

In certain embodiments, a wireless mobile node 20a receives the locations of other wireless mobile nodes 20 over a wireless link. Wireless mobile node 20a determines geometric features, where each geometric feature corresponds to a location. Wireless mobile node 20a calculates an apparatus location of wireless mobile node 20a from the locations and geometric features.

In certain embodiments, wireless mobile node 20a moves to a new, unknown location and may notify other wireless mobile nodes 20 that its location is unknown. Wireless mobile node 20a collects information from other wireless mobile nodes 20 with known locations to determine its new location. Wireless mobile node 20a may notify other wireless mobile nodes 20 that its location is now known.

In the illustrated example of FIG. 1, a node Pi with an unknown location (an "unknown node") may receive the locations of any suitable number of nodes Pj, . . . , Pk with known locations ("known nodes") and calculate its location. For example, node P2 receives the locations of node P3 and P9 and then calculates its location.

A wireless mobile node 20 may be a communication device that communicates with other communication devices over a wireless link. The wireless link may be provided by broadband wireless access, for example, Worldwide Interoperability for Microwave Access (WiMAX). In certain embodiments, wireless mobile node 20 can be readily moved or can move itself. For example, wireless mobile node 20 may have a size and/or shape such that node 20 can be carried by a human. As another example, wireless mobile node 20 may include or be coupled to a system that can move wireless mobile node 20.

In certain embodiments, a wireless mobile node 20 may be embodied as any suitable device, such as a telephone, a computer, a computer peripheral device, a missile device, a nano-device, or a vehicle. A telephone may be any suitable telecommunications device that transmits and receives audio and/or video. A computer may be any suitable programmable device that receives input, stores and manipulates data, and/or provides output. A peripheral may be any suitable device attached to (but not part of) a host computer. Examples of computer peripheral devices include scanners, keyboards, mice, cameras, microphones, monitors, printers, plotters, speakers, and hard drives.

A missile may be any suitable weapon system propelled toward a target with a guidance mechanism. A nano-device may be any suitable device sized around 1 to 100 nanometers in at least one dimension. Examples of nano-devices include medical nano-devices (which may be used inside of a living organism such as a human), as well as electronic, energy producing, and other nano-devices. A vehicle may be any suitable device that is used to transport people or cargo. Examples of vehicles include bicycles, cars, motorcycles, trains, ships, boats, and aircraft.

In certain embodiments, a wireless mobile node 20 may be embodied as a device in any suitable manner. For example, wireless mobile node 20 may be regarded as the device itself. As another example, wireless mobile node 20 may be coupled to or placed within the device.

Figure 3:
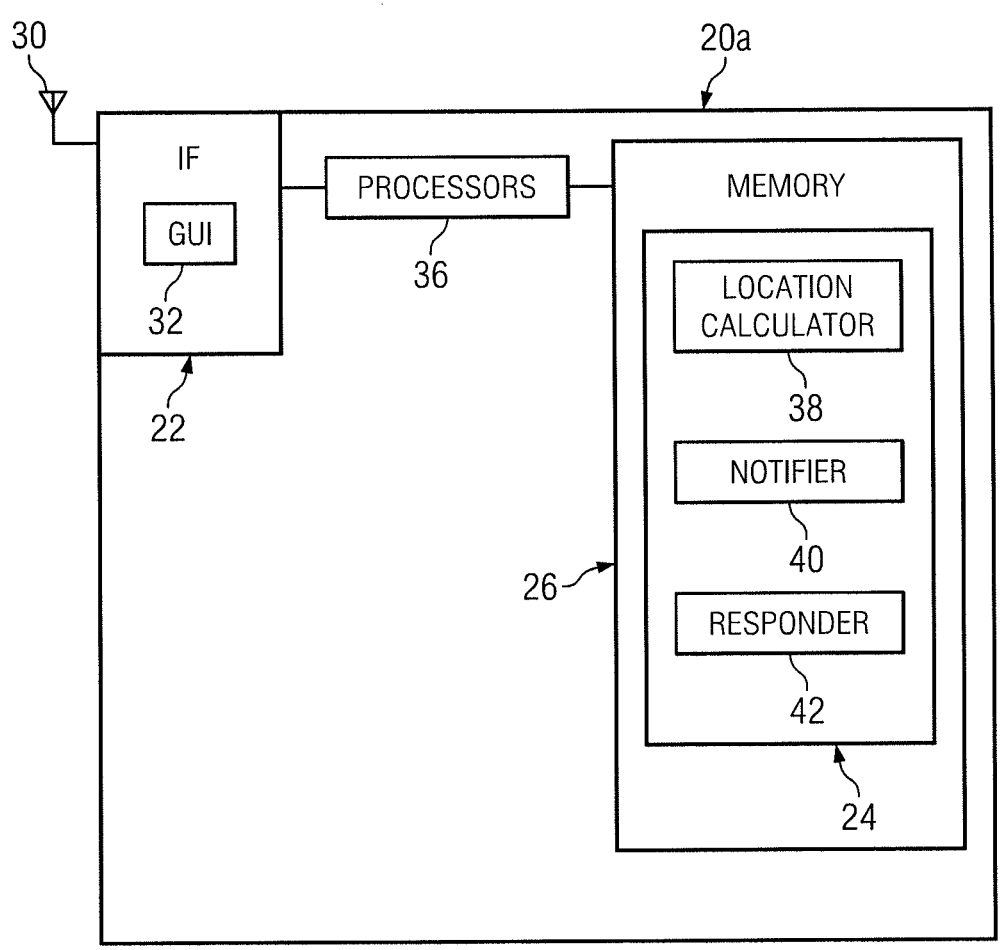
FIG. 3 illustrates an example of an embodiment of wireless mobile node for which location may be determined.

FIG. 3 illustrates an example of an embodiment of wireless mobile node 20a. In the illustrated example of FIG. 3, wireless mobile node 20a includes an interface 22, logic 24, and one or more memories 26. Interface 22 may include an antenna 30 and a graphical user interface (GUI) 32. Logic 24 may include one or more processors 36 and one or more applications, such as a location calculator 38, a notifier 40, and a responder 42. Memory 26 may store the applications.

Graphical user interface 32 may include a display or other output device that may be used to provide the location of one or more wireless mobile nodes 20. In certain examples, graphical user interface 32 may be used to display location information, such as advertisements, that are related to the location of the mobile node 20a.

Antenna 30 communicates with other communication devices (such as wireless mobile nodes 20) over a wireless link. In certain embodiments, antenna 30 receives the locations of wireless mobile nodes.

In certain embodiments, location calculator 38 determines geometric features and calculates the location of wireless mobile node 20a from the locations and the geometric features. Location calculator 38 may calculate the location in two dimensions or in three dimensions.

Location may be expressed in any suitable coordinate system. For example, a coordinate system relative to the Earth, such as latitude and longitude, may be used.

As another example, a coordinate system relative to particular structure, such as the floors of a building, may be used.

Any suitable geometric feature may be used. For example, a geometric feature may be an angle or a distance. Location calculator 38 may determine the geometric features in any suitable manner. For example, location calculator 38 may receive the geometric features from other wireless mobile nodes 20 or may calculate the geometric features from information stored at wireless mobile node 20a and/or received from other wireless mobile nodes 20.

Location calculator 38 may calculate the location of wireless mobile node 20a in any suitable manner. In certain embodiments, location calculator 38 uses triangulation to calculate the location. In the embodiments, the geometric features include one or more distances and two or more angles. The distances may be the distances between two known locations, and may be calculated from the coordinates of the locations using a distance formula.

The angles may provide information about the relationship among known and unknown nodes. In two-dimensions, two known nodes may be used. For each known node, an angle may be measured between a first line from the known node to the unknown node and a second line between the two known nodes. In the illustrated example of FIG. 1, angle α may be measured between line A between the locations of nodes P2 and P3 and line L between the locations of nodes P3 and P9. Angle β may be measured between line B between the locations of nodes P2 and P9 and line L. Location calculator 38 may use triangulation to calculate the 2-D location from the distance between the known nodes and the two angles.

In three-dimensions, three known nodes may be used. For each known node, an inclination angle and an azimuth angle may be measured between a line from the known node to the unknown node and a second line and a plane formed by the three known nodes. Location calculator 38 may use triangulation to calculate the 3-D location from the distances between the known nodes and the inclination and azimuth angle angles.

The angles may be determined in any suitable manner. In certain embodiments, a known node can measure the angles and send the measurements to location calculator 38 of the unknown node. For example, in 2-dimensions, a known node can measure the angle between a first line from the known node to the unknown node and a second line between the two known nodes. As another example, in 3-dimensions, a known node can measure the inclination angle and the azimuth angle between a line from the known node to the unknown node and a second line and a plane formed by the three known nodes.

In certain embodiments, location calculator 38 uses trilateration to calculate the apparatus location. In the embodiments, the geometric features include distances between known and unknown nodes. The distances between nodes may be determined in any suitable manner. For example, the distance between two known nodes may be calculated from the coordinates of the nodes using a distance formula. As another example, a first node may determine the distance to a second node using a signal and D=RT, where R represents the speed of the signal (speed of light) and T represents the time it takes the signal to travel between the first and second nodes. As another example, a first node may determine the distance to a second node using a signal and D=RT'/2, where R represents the speed of the signal (speed of light) and T' represents the roundtrip time it takes the signal to travel from the first node to the second node and back to the first node. In certain examples, the unknown node can determine the distances or a known node can determine the distances and send them to the unknown node.

Location calculator 38 may use trilateration to calculate a 2D or 3-D location. In two dimensions, the distances between two known and one unknown node yields two possible locations for the unknown node. A third known node or other information may be used to select the correct location. In three dimensions, the distances between three known nodes and one unknown node yields two locations for the unknown node. A fourth known node or other information may be used to select the correct location.

Notifier 40 sends notifications to other wireless mobile nodes. Notifier 40 may send notifications periodically or in response to a request. In certain embodiments, notifier 40 may send a notification that the apparatus location is unknown prior to calculating the apparatus location. For example, if wireless mobile node 20a moves to a new unknown location, notifier 40 sends a notification that the location is unknown. In certain embodiments, notifier 40 may send a notification that the apparatus location is known after calculating the apparatus location. The notification may include the apparatus location.

In certain embodiments, notifier 40 may send a notification to a wireless node that responds with information related to the apparatus location. As an example, the apparatus location may be in a structure, such as a building. Examples of information related to the apparatus location may include: instructions on how to navigate to other parts of the structure, descriptions of entities (such as products) that are located at or near the apparatus location, and advertisements of products located at or near the apparatus location. The information may be presented to a user via GUI 32.

Responder 42 performs actions in response to the apparatus location. For example, wireless mobile nodes 20 may be embodied in different vehicles. Responder 42 may determine that the vehicles are too close. For example, responder 42 may determine that a distance between the apparatus location and a location of the other wireless device is less than a threshold, for example, a threshold with a value that is in the range of less than 1, 1 to 2, or 2 to 5 feet. Responder 42 may instruct its vehicle to perform a collision avoidance action in response to the determination. A collision avoidance action is an action designed to avoid a collision, for example, steer away from the other vehicle or slow down.

In certain embodiments, wireless mobile nodes 20 may participate in a communication session to communicate with each other. Information may be communicated during a communication session. Information may refer to voice, data, text, audio, video, multimedia, control, signaling, other information, or any combination of any of the preceding. Information may be communicated in packets. A packet comprises a bundle of data organized in a specific way for transmission.

Communication protocols and technologies may be used to provide the communication sessions. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), biological memory (for example, DNA methylation memory), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving, at an apparatus including a microcontroller, a plurality of known locations of a plurality of wireless mobile nodes over a wireless link;
determining the apparatus is located in a three-dimensional (3-D) environment in response to detecting a first plurality of wireless mobile nodes arranged in a 3-D arrangement and located in a two-dimension (2-D) environment in response to detecting a second plurality of wireless mobile nodes arranged in a 2-D arrangement;
selectively operating the microcontroller in a two-dimensional (2-D) location mode to calculate the apparatus location in response to detecting the 2-D environment, and a three-dimensional (3-D) location mode to calculate the apparatus location in response to detecting the 3-D environment, each of the 2-D and 3-D location modes configured to determine a plurality of geometric features associated with the plurality of locations; and
calculating via the microcontroller the apparatus location from the plurality of known locations and the plurality of geometric features, the 3-D location mode using a first plurality of known locations including a first coordinate system based on longitude and latitude with respect to the earth and the 2-D location mode using a second plurality of known locations including a second coordinate system different from the first coordinate system based on physical dimensions of structures,
wherein, when operating in the 3-D location mode, the apparatus location is calculated using a plurality of angles, an angle indicating a relationship between the apparatus location and a known location, an inclination angle and the azimuth angle between a line from the known node to the unknown node and a second line and a plane formed by the three known nodes; and one or more distances between two or more known locations; and the calculating the apparatus location comprising calculating the apparatus location from the angles and the distances using triangulation,
wherein, when operating in the 2-D location mode, the apparatus location is calculated without using an inclination angle and the azimuth angle between a line from the known node to the unknown node and a second line and a plane formed by the three known nodes, and
displaying a calculated location of at least one wireless node included in the 2-D environment or the 3-D environment.

2. The method of claim 1, the plurality of geometric features comprising a plurality of distances, a first distance measured between a known location and the apparatus location, a second distance measured between two known locations; the physical dimensions including floors and walls of buildings;

and the calculating the apparatus location comprising calculating the apparatus location from the distances using trilateration.

3. The method of claim 1, further comprising: notifying the plurality of wireless mobile nodes that the apparatus location is known after calculating the apparatus location.

4. The method of claim 1, further comprising: notifying the plurality of wireless mobile nodes that the apparatus location is unknown prior to calculating the apparatus location.

5. The method of claim 1, the apparatus embodied in a device of the following devices: a telephone, a computer, a computer peripheral device, a missile device, a nano-device, and a vehicle.

6. The method of claim 1, further comprising: notifying via the microcontroller a wireless node of the apparatus location via broadband wireless communication; and receiving, from the wireless node, information related to the apparatus location via the broadband wireless communication without using a global position satellite (GPS) system.

7. The method of claim 1, further comprising: receiving an advertisement related to the apparatus location.

8. The method of claim 1: the apparatus embodied in a vehicle; the method further comprising:
   determining that a distance between the apparatus location and a location of a wireless device is less than a threshold; and
   instructing the vehicle to perform a collision avoidance action in response to the determination.

9. An apparatus comprising:
   an input configured to receive a plurality of known locations of a plurality of wireless mobile nodes over a wireless link; and one or more processors configured to:
   determine the apparatus is located in a three-dimensional (3-D) environment in response to detecting a first plurality of wireless mobile nodes arranged in a 3-D arrangement and located in a two-dimension (2-D) environment in response to detecting a second plurality of wireless mobile nodes arranged in a 2-D arrangement;
   selectively operate in a two-dimensional (2-D) location mode to calculate the apparatus location in response to detecting the 2-D environment and a three-dimensional (3-D ) location mode to calculate the apparatus location in response to detecting the 3-D environment, each of the 2-D and 3-D location modes configured to determine a plurality of geometric features associated with the plurality of locations; and calculate the apparatus location from the plurality of known locations and the plurality of geometric features, the 3-D location mode using a first plurality of known locations including a first coordinate system based on longitude and latitude with respect to the earth and the 2-D location mode using a second plurality of known locations including a second coordinate system different from the first coordinate system based on physical dimensions of structures,
   wherein the plurality of geometric features used during the 3-D operating mode include a plurality of angles, an angle indicating a relationship between the apparatus location and a known location, and one or more distances between two or more known locations, an inclination angle and the azimuth angle between a line from the known node to the unknown node and a second line and a plane formed by the three known nodes,
   wherein the physical dimensions used during the 2-D operating mode include floors and walls of buildings while excluding an inclination angle and the azimuth angle between a line from the known node to the unknown node and a second line and a plane formed by the three known nodes, and
   wherein the apparatus includes a graphical user interface configured to display a calculated location of at least one wireless node included in the 2-D environment or the 3-D environment.

10. The apparatus of claim 9, the plurality of geometric features comprising a plurality of distances, a first distance measured between a known location and the apparatus location, a second distance measured between two known locations; the physical dimensions including floors and walls of buildings; and the calculating the apparatus location comprising calculating the apparatus location from the distances using trilateration.

11. The apparatus of claim 9, the one or more processors configured to: notify the plurality of wireless mobile nodes that the apparatus location is known after calculating the apparatus location.

12. The apparatus of claim 9, the one or more processors configured to: notify the plurality of wireless mobile nodes that the apparatus location is unknown prior to calculating the apparatus location.

13. The apparatus of claim 9, the apparatus embodied in a device of the following devices: a telephone, a computer, a computer peripheral device, a missile device, a nano-device, and a vehicle.

14. The apparatus of claim 9, the one or more processors configured to: notify a wireless node of the apparatus location via a broadband wireless communication network; and receive, from the wireless node, information related to the apparatus location via the broadband wireless communication network without communicating with a satellite connected in a global satellite system (GPS) communication.

15. The apparatus of claim 9, the one or more processors configured to: receive an advertisement related to the apparatus location.

16. The apparatus of claim 9, the apparatus embodied in a vehicle; the one or more processors configured to: determine that a distance between the apparatus location and a location of a wireless device is less than a threshold; and instruct the vehicle to perform a collision avoidance action in response to the determination.

17. An apparatus comprising: an input configured to receive a plurality of known locations of a plurality of wireless mobile nodes over a wireless link, and one or more processors configured to:
   determine the apparatus is located in a three-dimensional (3-D) environment in response to detecting a first plurality of wireless mobile nodes arranged in a 3-D arrangement and located in a two-dimension (2-D) environment in response to detecting a second plurality of wireless mobile nodes arranged in a 2-D arrangement;
   selectively operate in a two-dimensional (2-D) location mode in response to detecting the 2-D environment to calculate the apparatus location and a three-dimensional (3-D) location mode in response to detecting the 3-D environment to calculate the apparatus location, each of the 2-D and 3-D location modes configured to determine a plurality of geometric features associated with the plurality of locations, the plurality of geometric features comprising:
     in the 3-D location mode, a plurality of angles, an angle indicating a relationship between the apparatus location and a known location, an inclination angle and the azimuth angle between a line from the known node to the unknown node and a second line and a plane formed by the three known nodes; and in the 2-D location mode, one or more distances between two or more known locations while excluding the inclination angle and the azimuth angle;

calculate the apparatus location from the plurality of known locations and the plurality of geometric features using triangulation;

notify the plurality of wireless mobile nodes that the apparatus location is known after calculating the apparatus location, the plurality of known locations, the 3-D location mode using a first plurality of known locations including a first coordinate system based on longitude and latitude with respect to the earth, and the 2-D location mode using a second plurality of known locations including a second coordinate system different from the first coordinate system based on physical dimensions of structures; and display a calculated location of at least one wireless node included in the 2-D environment or the 3-D environment.

18. The apparatus of claim 17, the one or more processors configured to: receive an advertisement related to the apparatus location.

19. The apparatus of claim 17, the apparatus embodied in a vehicle; the one or more processors configured to: determine that a distance between the apparatus location and a location of a wireless device is less than a threshold; and instruct the vehicle to perform a collision avoidance action in response to the determination.

20. The apparatus of claim 19, wherein the apparatus is embodied in a device of the following devices: a telephone, a computer, a computer peripheral device, a missile device, a vehicle.

* * * * *